(12) United States Patent
Guo et al.

(10) Patent No.: US 11,468,010 B2
(45) Date of Patent: Oct. 11, 2022

(54) METHOD, APPARATUS, AND COMPUTE PROGRAM PRODUCT FOR DETERMINING CONSISTENCE LEVEL OF SNAPSHOTS OF VIRTUAL MACHINES

(71) Applicant: EMC IP Holding Company LLC, Hopkinton, MA (US)

(72) Inventors: Jingjing Guo, Shanghai (CN); Lei Wang, Shanghai (CN); Jing Yu, Shanghai (CN); Xiaoliang Zhu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 841 days.

(21) Appl. No.: 16/251,391

(22) Filed: Jan. 18, 2019

(65) Prior Publication Data
US 2019/0220444 A1 Jul. 18, 2019

(30) Foreign Application Priority Data
Jan. 18, 2018 (CN) .......................... 201810050354.5

(51) Int. Cl.
*G06F 16/17* (2019.01)
*G06F 16/11* (2019.01)
*G06F 9/455* (2018.01)
*G06F 11/14* (2006.01)

(52) U.S. Cl.
CPC ...... *G06F 16/1734* (2019.01); *G06F 9/45558* (2013.01); *G06F 11/1471* (2013.01); *G06F 16/128* (2019.01); *G06F 2009/45562* (2013.01); *G06F 2009/45575* (2013.01); *G06F 2009/45587* (2013.01)

(58) Field of Classification Search
CPC ............... G06F 16/1734; G06F 16/128; G06F 9/45558; G06F 11/1471; G06F 2009/45562; G06F 2009/45587; G06F 2009/45575
See application file for complete search history.

(56) References Cited

U.S. PATENT DOCUMENTS

| 7,529,782 B2 * | 5/2009 | Prahlad | G06F 11/1435 |
| 7,617,262 B2 * | 11/2009 | Prahlad | G06F 16/184 |
| 8,037,032 B2 * | 10/2011 | Pershin | G06F 11/1451 707/672 |
| 8,046,550 B2 * | 10/2011 | Feathergill | G06F 11/1466 718/1 |

(Continued)

*Primary Examiner* — Robert W Beausoliel, Jr.
*Assistant Examiner* — Susan F Rayyan
(74) *Attorney, Agent, or Firm* — Chamberlain, Hrdlicka, White, Williams & Aughtry

(57) ABSTRACT

Embodiments of the present disclosure relate to a method, device and computer program product for determining a consistency level of a virtual machine snapshot. The method comprises obtaining a backup log file of the virtual machine snapshot generated in a virtual machine backup process, the backup log file comprising log information related to the generation of the virtual machine snapshot. The method further comprises determining the consistency level of the virtual machine snapshot based on the backup log file, the consistency level indicating a matching degree between a state of a virtual machine represented by the virtual machine snapshot and an actual state of the virtual machine when the virtual machine snapshot is generated.

15 Claims, 3 Drawing Sheets

(56) References Cited

U.S. PATENT DOCUMENTS

| | | | | |
|---|---|---|---|---|
| 8,122,212 | B2* | 2/2012 | Otani | G06F 11/1451 711/162 |
| 8,195,980 | B2* | 6/2012 | Schuba | G06F 9/45558 714/15 |
| 8,205,050 | B2* | 6/2012 | De Baer | G06F 9/45533 711/162 |
| 8,225,059 | B2* | 7/2012 | Nakamura | G06F 11/2094 711/162 |
| 8,321,377 | B2* | 11/2012 | Michael | G06F 9/45504 707/831 |
| 8,359,593 | B2* | 1/2013 | Golosovker | G06F 12/08 718/1 |
| 8,782,003 | B1* | 7/2014 | Patterson | G06F 16/1734 707/624 |
| 9,619,473 | B1* | 4/2017 | Chopra | G06F 3/0486 |
| 9,639,426 | B2* | 5/2017 | Pawar | G06F 9/445 |
| 9,672,264 | B2* | 6/2017 | Poluri | G06F 16/27 |
| 9,690,791 | B1* | 6/2017 | Chopra | G06F 11/1464 |
| 9,804,929 | B2* | 10/2017 | Karinta | G06F 11/1451 |
| 10,061,650 | B2* | 8/2018 | Gladwin | H04L 29/00 |
| 10,139,769 | B2* | 11/2018 | Ito | G03G 15/5004 |
| 10,146,635 | B1* | 12/2018 | Chai | G06F 11/302 |
| 10,210,162 | B1* | 2/2019 | Rees | G06F 3/0611 |
| 10,599,524 | B2* | 3/2020 | Zhang | G06F 16/128 |
| 10,621,058 | B2* | 4/2020 | Patnaik | G06F 11/2094 |
| 10,740,187 | B1* | 8/2020 | Prabhakar | G06F 16/182 |
| 10,855,554 | B2* | 12/2020 | Freeman | H04L 41/5019 |
| 11,061,777 | B2* | 7/2021 | Kohler | G06F 11/1458 |
| 2004/0260726 | A1* | 12/2004 | Hrle | G06F 11/1466 |
| 2005/0154734 | A1* | 7/2005 | Zucchini | G06F 11/1461 |
| 2006/0206544 | A1* | 9/2006 | Oks | G06F 11/1458 |
| 2007/0244938 | A1* | 10/2007 | Michael | G06F 16/128 |
| 2009/0113109 | A1* | 4/2009 | Nelson | G06F 11/2046 711/6 |
| 2009/0216816 | A1* | 8/2009 | Basler | G06F 11/1464 |
| 2009/0228671 | A1* | 9/2009 | Shigemura | G06F 11/1466 711/162 |
| 2010/0107158 | A1* | 4/2010 | Chen | G06F 11/1484 718/1 |
| 2010/0169592 | A1* | 7/2010 | Atluri | G06F 11/1471 711/162 |
| 2011/0252208 | A1* | 10/2011 | Ali | G06F 11/1451 711/162 |
| 2012/0084258 | A1* | 4/2012 | Karonde | G06F 16/2308 707/641 |
| 2012/0233123 | A1* | 9/2012 | Shisheng | G06F 11/004 707/639 |
| 2013/0024722 | A1* | 1/2013 | Kotagiri | G06F 11/1004 714/6.1 |
| 2013/0166863 | A1* | 6/2013 | Buragohain | G06F 11/1446 711/162 |
| 2013/0212068 | A1* | 8/2013 | Talius | G06F 16/1734 707/639 |
| 2015/0186217 | A1* | 7/2015 | Eslami Sarab | G06F 11/1435 707/649 |
| 2015/0212892 | A1* | 7/2015 | Li | G06F 11/1446 707/649 |
| 2015/0227602 | A1* | 8/2015 | Ramu | G06F 11/1456 707/634 |
| 2015/0242283 | A1* | 8/2015 | Simoncelli | G06F 11/1456 711/162 |
| 2015/0370652 | A1* | 12/2015 | He | G06F 11/1451 714/19 |
| 2016/0034481 | A1* | 2/2016 | Kumarasamy | G06F 11/16 707/639 |
| 2016/0217194 | A1* | 7/2016 | Poluri | G06F 16/27 |
| 2018/0260119 | A1* | 9/2018 | Atia | G06F 3/067 |
| 2018/0267861 | A1* | 9/2018 | Iyer | G06F 3/065 |
| 2020/0349028 | A1* | 11/2020 | Meadowcroft | G06F 3/0656 |

* cited by examiner

METHOD, APPARATUS, AND COMPUTE PROGRAM PRODUCT FOR DETERMINING CONSISTENCE LEVEL OF SNAPSHOTS OF VIRTUAL MACHINES

FIELD

Embodiments of the present disclosure generally relate to the field of virtual machines, and more specifically, to a method, device and computer program product for determining a consistency level of a virtual machine snapshot.

BACKGROUND

When a proxy system (e.g. Avamar Proxy) in a virtual machine backup/recovery system performs backups, e.g. image backups to virtual machines running on a platform like vSphere, typically it needs to take a virtual machine snapshot into the virtual machine before actual backup of virtual machine data occurs. The virtual machine snapshot will try to capture the state of the virtual machine when the virtual machine snapshot is taken. In future recovery, data in the image backup will be recovered to the same state of the data as that when the backup occurred.

However, the state of the virtual machine represented by the virtual machine snapshot does not always completely match the actual state of the virtual machine when the virtual machine snapshot is taken. Therefore, there is a need to determine the match situation between the state of the virtual machine represented by the virtual machine snapshot and the actual state of the virtual machine when the virtual machine snapshot is taken. However, in the prior art there lacks a unified and efficient method to accomplish this object.

SUMMARY

The embodiments of the present disclosure provide a method, device and computer program product for determining a consistency level of a virtual machine snapshot.

In a first aspect of the present disclosure, provided is a method for determining a consistency level of the virtual machine snapshot. The method comprises: obtaining a backup log file of a virtual machine snapshot generated in a virtual machine backup process, the backup log file comprising log information related to the generation of the virtual machine snapshot; and determining the consistency level of the virtual machine snapshot based on the backup log file, the consistency level indicating a matching degree between a state of a virtual machine represented by the virtual machine snapshot and an actual state of the virtual machine when the virtual machine snapshot is generated.

In a second aspect of the present disclosure, provided is a device for determining a consistency level of a virtual machine snapshot. The device comprises: at least one processing unit; at least one memory being coupled to the at least one processing unit and storing instructions for being executed by the at least one processing unit, the instructions, when being executed by the at least one processing unit, causing the device to perform actions, the actions comprising: obtaining a backup log file of the virtual machine snapshot generated in a virtual machine backup process, the backup log file comprising log information related to the generation of the virtual machine snapshot; and determining the consistency level of the virtual machine snapshot based on the backup log file, the consistency level indicating a matching degree between a state of a virtual machine represented by the virtual machine snapshot and an actual state of the virtual machine when the virtual machine snapshot is generated.

In a third aspect of the present disclosure, provided is a computer program product. The computer program product is tangibly stored on a non-transient computer readable medium and comprises machine executable instructions which, when being executed, causing a machine to perform any step of the method according to the first aspect of the present disclosure.

This SUMMARY is provided to introduce a selection of concepts in a simplified form that are further described below in the Detailed Description. This SUMMARY portion is not intended to limit key or important features of the embodiments of the present disclosure or to limit the scope of the present disclosure.

BRIEF DESCRIPTION OF THE DRAWINGS

Through the more detailed description of exemplary embodiments of the present disclosure with reference to the accompanying drawings, the above and other objects, features and advantages of the present disclosure will become more apparent, wherein in the exemplary embodiments of the present disclosure, the same reference numerals typically represent the same components.

Throughout the figures, the same or corresponding numerals denote the same or corresponding parts.

DETAILED DESCRIPTION OF EMBODIMENTS

Figure 1:
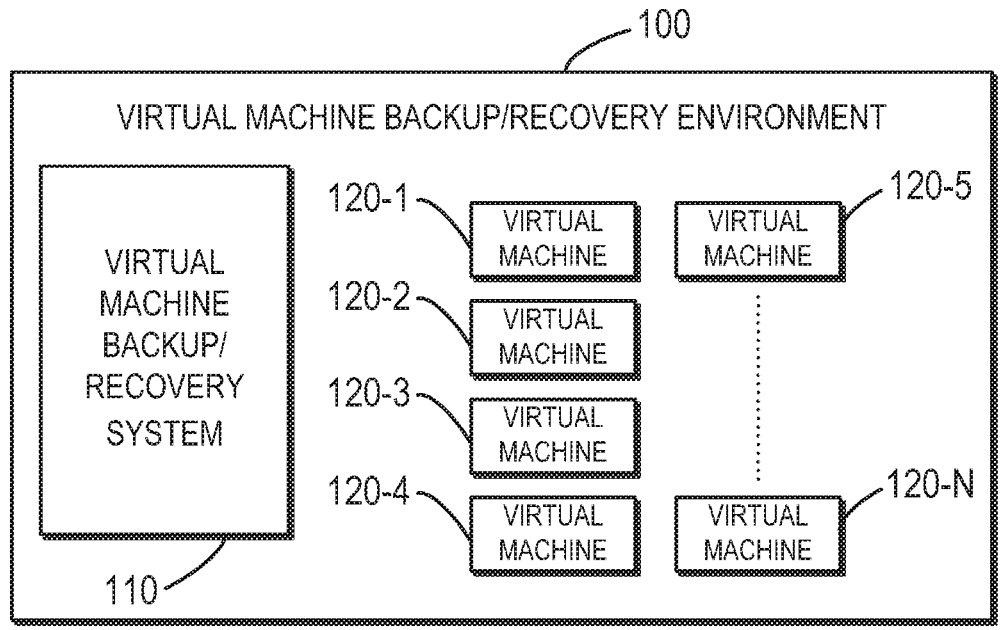
FIG. 1 shows an architecture view of a virtual machine backup/recovery environment 100 according to the embodiments of the present disclosure.

Some preferable embodiments will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other explicit and implicit definitions might be included below.

As described in the BACKGROUND, the state of the virtual machine represented by the virtual machine snapshot does not always completely match the actual state of the virtual machine when the virtual machine snapshot is taken.

For some specific application operations, such as database operations, if a user does not accurately know how match it is between the state of the virtual machine represented by the virtual machine snapshot and the actual state of the virtual machine when the virtual machine snapshot is taken, the user might choose a poor matched virtual machine snapshot, and further a bad consequence may be caused. Therefore, for example, when a virtual machine snapshot cannot successfully capture data in memory or pending I/O in the virtual machine, recovery from such virtual machine snapshots requires an extra consistence check or recovery to determine whether the virtual machine snapshot can correctly reflect the actual state of the virtual machine when the virtual machine snapshot is taken, before an application can be brought back online. In addition, some value added features, such as Microsoft SQL server log truncation and data rollback after virtual machine backup, also need to know exactly whether the virtual machine snapshot can correctly reflect the actual state of the virtual machine when the virtual machine snapshot is taken, and to decide whether these value added features are permitted to be executed or not. Otherwise, performing these operations will cause operation failure and even data loss. For another example, when indexing metadata, it is necessary to at least guarantee that metadata in a file system of the virtual machine are consistently matched, otherwise a resulting index will have an error.

In order to at least partially overcome the foregoing problems in the prior art, the generated virtual machine snapshot may be divided into different snapshot consistency levels so as to indicate a matching degree between the state of the virtual machine represented by the virtual machine snapshot and the actual state of the virtual machine when the virtual machine snapshot is taken.

In general, snapshot consistency levels may consist of three levels. Snapshot consistency levels may be divided into failure consistency level, file consistency level and application consistency level in a low-to-high order The failure consistency level is sometimes called crash consistency level, which means the generated virtual machine snapshot captures and saves all the files on the virtual machine disks. The failure consistency level virtual machine snapshot corresponds to an instantaneous state of the virtual machine which is saved when the virtual machine fails, e.g. is powered off or crashes. Such a snapshot may guarantee files in the virtual machine disks exist but does not guarantee all fails are available. This is because perhaps a file is being written when the virtual machine is powered off or crashes, whereas the write might not be reflected on a disk, for example inputted words might not be saved in a document. At this point, the file might be susceptible to corruption and even cause the virtual machine from being started normally. Therefore, to leverage the failure consistency level virtual machine snapshot to recover the virtual machine, typically there is a need to scan and recover the file system.

The file consistency level means no file system writes are in flight when the virtual machine snapshot is taken. Hence, the file consistency level virtual machine snapshot may guarantee that the file system itself is normal. However, the file consistency level virtual machine snapshot cannot guarantee all files in the file system are normal. This is because the file system is divided into metadata and user data, wherein a cache of the file system might be normal so that all data generated in the cache of the virtual snapshot file system are flushed to the virtual machine disk. However, data in a cache of the application its own might not be flushed to the virtual machine disk. In other words, the file consistency level means it is guaranteed no I/O is being processed in the file system when the virtual machine snapshot is taken, and if an I/O is being processed in the file system, then the virtual machine snapshot will only be taken after the I/O is completed.

The application consistency level means all data relating to memory operations and I/O operations in caches of the application and the file system of the virtual machine are successfully flushed to virtual machine disks when the virtual machine snapshot is taken. Therefore, the application consistency level virtual machine snapshot may be construed to have no error or almost have no error, so that virtual machine disks is just as raw disks after recovery from the application consistency level virtual machine snapshot.

Although snapshot consistency levels are divided into failure consistency level, file consistency level and application consistency level as described above, according to the embodiments of the present disclosure, snapshot consistency levels may be divided into more levels. For example, the file consistency level may be further divided into multiple levels depending on the number of errors comprised in the file consistency level virtual machine snapshot.

However, in the prior art there lacks a unified and efficient method for accurately determining a snapshot consistency level of a generated virtual machine snapshot. To this end, the present disclosure provides a method, device and computer program product for determining a consistency level of a virtual machine snapshot, so as to use a unified method to over the problem in the prior art that a snapshot consistency level of a generated virtual machine snapshot cannot be determined for some virtual machine software or different versions of some virtual machine software.

FIG. 1 shows an architecture view of a virtual machine backup/recovery environment 100 according to the embodiments of the present disclosure. As shown in FIG. 1, the virtual machine backup/recovery environment 100 comprises a virtual machine backup/recovery system 110 and multiple virtual machines 120-1 to 120-N (collectively referred to as virtual machine 120 below, and the virtual machine 120 may also represent any one or more of the virtual machines 120-1 to 120-N). In the virtual machine backup/recovery environment 100, the virtual machine backup/recovery 110 effects backup and recovery for the virtual machine 120.

Description is presented below to a general flow from requesting virtual machine back to backing up the virtual machine and further to executing subsequent operations. It should be appreciated that the flow to be described below may further comprise additional steps that are not shown and/or may omit steps that are shown, and the scope of the present disclosure is not limited in this regard.

First, an authorized entity requests the virtual machine backup/recovery system 110 to back up the virtual machine 120. According to the embodiments of the present disclosure, the authorized entity may comprise an administrator, a user of the virtual machine 120 and any other entity that has the right to use the virtual machine 120 or has the right to execute a backup for the virtual machine 120.

Then, the virtual machine backup/recovery system 110 takes a virtual machine snapshot of the virtual machine 120. According to the embodiments of the present disclosure, before taking the virtual machine snapshot, the virtual machine backup/recovery system 110 may verify whether the entity requesting to back up the virtual machine 120 has the right to request a backup. The virtual machine backup/recovery system 110 takes the virtual machine snapshot of the virtual machine 120 only in response to the entity requesting to back up the virtual machine 120 having the right to request a backup.

Next, the virtual machine backup/recovery system 110 determines a snapshot consistency level of the generated virtual machine snapshot. The unified and efficient method for determining the snapshot consistency level of the generated virtual machine snapshot as proposed in the present disclosure will be described with reference to FIGS. 2 and 3. According to the embodiments of the present disclosure, in order to facilitate the administrator, customer or user of the virtual machine 120 to choose an appropriate snapshot consistency level virtual machine snapshot for subsequent operations corresponding to the snapshot consistency level, the virtual machine backup/recovery system 110 may, after determining the snapshot consistency level of the generated virtual machine snapshot, send the snapshot consistency level of the generated virtual machine snapshot to the administrator, customer or user of the virtual machine 120 or broadcast the same to potential users of the virtual machine snapshot. According to the embodiments of the present disclosure, the sending or broadcasting may be implemented at any time after the snapshot consistency level of the generated virtual machine snapshot is determined and before the generated virtual machine snapshot is used. According to other embodiments of the present disclosure, the virtual machine backup/recovery system 110 may not proactively send or broadcast the snapshot consistency level of the generated virtual machine snapshot but send the same on request, or may not send the snapshot consistency level of the generated virtual machine snapshot but directly perform different operations depending on different snapshot consistency levels according to default instructions or instructions set by the administrator, customer or user.

Later, the virtual machine backup/recovery system 110 completes the backup process for the virtual machine 120. According to the embodiments of the present disclosure, after taking the virtual machine snapshot, the virtual machine backup/recovery system 110 continues operations to complete the backup process for the virtual machine 120.

Finally, the virtual machine backup/recovery system 110 or the administrator, customer or user of the virtual machine 120 performs operations depending on the snapshot consistency level. According to the embodiments of the present disclosure, after the virtual machine backup, the user of the virtual machine 120 might perform different operations depending on the snapshot consistency level of the generated virtual machine snapshot, which operations may comprise, for example, log truncation, cloud disaster recovery, restore option and other operations in a database. Among these operations, the log truncation operation may be executed only when the snapshot consistency level of the generated virtual machine snapshot reaches the application consistency level. In addition, it needs to be judged depending on the snapshot consistency level which recovery operation is needed for the virtual machine system after rebooting. Therefore, it is important for the user of the virtual machine snapshot to know the actual snapshot consistency level for avoiding improper operations. For example, after recovering the virtual machine 120 by using the failure consistency level virtual machine snapshot, the database in the virtual machine 120 must not get to work immediately before extra consistency check and recovery. If the user wants to perform some database operations at this time, then an unexpected error will be caused.

The general flow for backing up the virtual machine 120 has been described. It should be appreciated that during virtual machine backup and recovery, to determine the snapshot consistency level of the generated virtual machine snapshot is of great significance. However, the prior art has many shortages in analyzing and determining the snapshot consistency level.

Take virtual machine software like VMware as an example. VMware does not provide an interface API to report the snapshot consistency level of the generated virtual machine snapshot on VMware version 6.0 and lower version. That is, the snapshot consistency level of the generated virtual machine snapshot is not provided on VMware version 6.0 and lower version. On VMware version 6.5 and higher version, the snapshot consistency level can be passed as a parameter when taking the virtual machine snapshot. If the parameter value indicates three different types: a first one is AUTO, i.e. virtual machine software automatically selects a suitable snapshot consistency level without stating which level is selected; a second one is similar to the file consistency level; and a third one is similar to the application consistency level. If the parameter value indicates the second or third type, then the virtual machine backup/recovery system 110 can determine the snapshot consistency level of the generated virtual machine snapshot according to the parameter value, wherein there is a need to analyze whether a type indicated by the parameter value is correct. If the parameter value indicates the first type, then the specific snapshot consistency level cannot be determined according to the parameter value. At the same time, when determining whether a type indicated by the parameter value is correct according to the analysis, still the specific snapshot consistency level cannot be determined. Therefore, on VMware version 6.5 and higher version, virtual machine software has serious shortages in determining the snapshot consistency level of the generated virtual machine snapshot.

In general, when virtual machine snapshot such as VMware determines a snapshot consistency level of a generated virtual machine snapshot, there may be comprised: first of all, taking a virtual machine snapshot for the virtual machine 120; then judging the version of VMware, if the version of VMware is 6.0 or lower, then the snapshot consistency level cannot be judged, or if the version of VMware is 6.5 or higher, then subsequent judgment is continued; next, judging a parameter which indicates the snapshot consistency level and is generated when taking the virtual machine snapshot, if the parameter indicates the first type, i.e. AUTO, then the snapshot consistency level cannot be judged, or if the parameter indicates the second or third type, then an operation is continued to determine whether the type indicated by the parameter is correct; later, performing a quiesce test, if the quiesce test has no error, then the type indicated by the parameter is correct, or if the quiesce test has an error, then subsequent judgement is continued as to the type indicated by the parameter; finally, if the parameter indicates the second type, degrading an actual snapshot consistency level of the generated virtual machine snapshot from the second type, i.e. the snapshot consistency level corresponding to the failure consistency level, or if the parameter indicates the third type, degrading the actual snapshot consistency level of the generated virtual machine snapshot from the third type, at which point since it cannot be determined whether the degraded snapshot consistency level corresponds to the file consistency level or the failure consistency level, the specific snapshot consistency level still cannot be determined.

So for VMware version 6.0 or lower and VMware 6.5 or higher with a parameter indicating the first type, a snapshot consistency level cannot be determined accurately. Meanwhile, in many cases, the snapshot consistency level still cannot be determined accurately for VMware version 6.5 version or higher with a parameter indicating the second type and the third type. In consequence, severe impacts may be exerted on the choice of the generated virtual machine snapshot and the choice of subsequent operations to the virtual machine snapshot.

Figure 2:
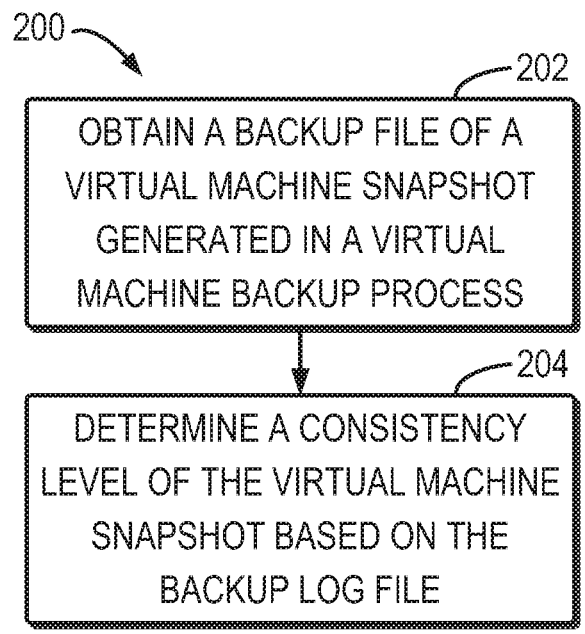
FIG. 2 shows a flowchart of a method 200 for determining a consistency level of a virtual machine snapshot according to the embodiments of the present disclosure.

FIG. 2 shows a flowchart of a method 200 for determining a consistency level of a virtual machine snapshot according to the embodiments of the present disclosure. By means of the method 200, the snapshot consistency level of the generated virtual machine snapshot may be determined in an efficient and unified manner. For example, take virtual machine software like VMware as an example. With the method 200, a specific snapshot consistency level can be accurately determined for various versions of VMware. It should be appreciated that the method 200 is only to determine the consistency level of the virtual machine snapshot, and thus does not comprise steps such as receiving a backup request for the virtual machine 120 and so on.

The method 200 starts from block 202 in which the virtual machine backup/recovery system 110 obtains a backup log file of a virtual machine snapshot generated during a virtual machine backup. According to the embodiments of the present disclosure, the backup log file comprises log information on the generation of the virtual machine snapshot.

In block 204, the virtual machine backup/recovery system 110 determines a consistency level of the virtual machine snapshot based on the backup log file. According to the embodiments of the present disclosure, the consistency level of the virtual machine snapshot indicates a matching degree between a state of a virtual machine represented by the virtual machine snapshot and an actual state of the virtual machine when the virtual machine snapshot is generated.

Figure 3:
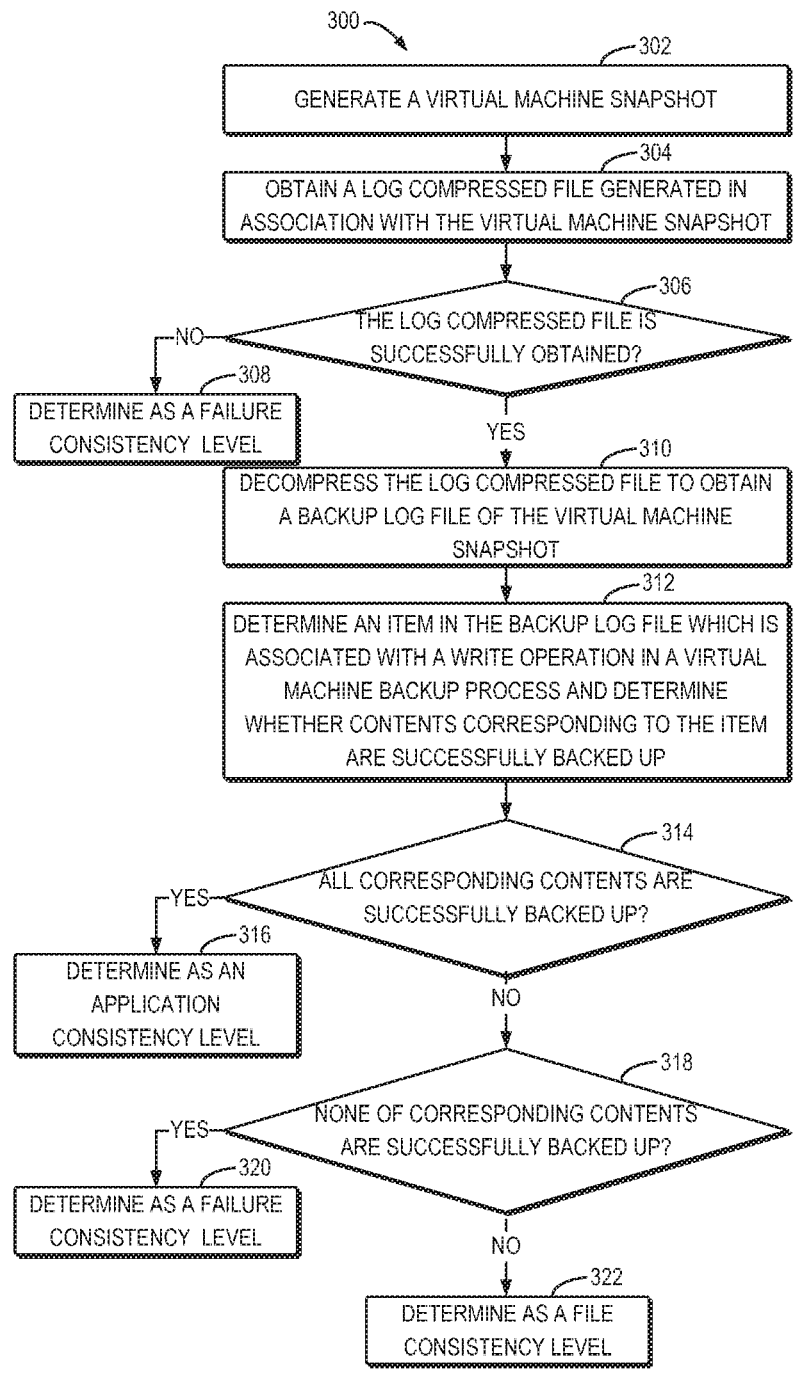
FIG. 3 shows a flowchart of a method 300 for determining a consistency level of a virtual machine snapshot according to the embodiments of the present disclosure.

FIG. 3 shows a flowchart of a method 300 for determining a consistency level of a virtual machine snapshot according to the embodiments of the present disclosure. By means of the method 300, the snapshot consistency level of the generated virtual machine snapshot may be determined in an efficient and unified manner. For example, take virtual machine software like VMware as an example. According to the embodiments of the present disclosure, the method 300 is further refinement of the method 200. It should be appreciated that the method 300 is not the only refinement of the method 200 and is not intended to limit the method 200 in any way.

The method 300 starts from block 302 in which the virtual machine backup/recovery system 110 takes a virtual machine snapshot for the virtual machine 120.

In block 304, the virtual machine backup/recovery system 110 obtains a log compressed file generated in associated with the virtual machine snapshot. According to the embodiments of the present disclosure, when taking the virtual machine snapshot on the virtual machine 120, the virtual machine backup/recovery system 110 will generate a temporary log compressed file associated with the virtual machine snapshot. For example, when generating the virtual machine snapshot on the Windows virtual machine 120, the Windows VSS (volume shadow copy service) virtual machine backup/recovery system 110 of Microsoft will generate a temporary compressed file, i.e. VSS manifest.zip file. The file is essentially a log file, which does not change with the change of the platform, is only associated with the operating system running on the virtual machine 120 and will be deleted after the virtual machine backup is completed. The file is substantially format-fixed since the Windows Vista version and has portability. Since the file is a log file, it may be analyzed. Since the file records all operations associated with VSS, operations which are performed within the operating system by the virtual machine snapshot can be learned. The file is usually stored in the same folder as the virtual machine 120 and will be placed together with the virtual machine snapshot and other relevant files. When taking the virtual machine snapshot, VMware software usually fetches the file out of the virtual machine 120 but does not leverage the file. Meanwhile, since the file is format-fixed, it may be analyzed briefly between different virtualization platforms and Microsoft platforms. Therefore, according to the embodiments of the present disclosure, the virtual machine backup/recovery system 110 may obtain the log compressed file by finding a path of the log compressed file and downloading the file locally. Meanwhile, according to the embodiments of the present disclosure, the log compressed file may be used for determining the snapshot consistency level of the generated virtual machine snapshot.

In block 306, the virtual machine backup/recovery system 110 determines whether the log compressed file has been successfully obtained or not. According to the embodiments of the present disclosure, when an error occurs to the generation of the virtual machine snapshot, the generation of the virtual machine fails or the quiesce test on the generated virtual machine snapshot fails, the log compressed file will not be generated. At this point, no log compressed file can be obtained in block 304. In the meanwhile, when the virtual machine snapshot is generated but the log compressed file is not obtained/generated, this means the snapshot consistency level of the generated virtual machine snapshot is a failure consistency level, as shown in block 308. When it is determined in block 306 that the log compressed file has been successfully obtained, the flow proceeds to block 310.

In block 310, the virtual machine backup/recovery system 110 decompresses the log compressed file to obtain a backup log file of the virtual machine snapshot. According to the embodiments of the present disclosure, the log compressed file compresses multiple compressed files, wherein the number of files may be ten more. Among these files, there may be included the backup log file. Therefore, the backup log file may be obtained by decompressing the log compressed file. For example, when the Windows VSS virtual machine backup/recovery system 110 of Microsoft generates the log compressed file manifest.zip on the Windows virtual machine 120, multiple files may be obtained by decompressing a backup.xml file, wherein the backup.xml file is the backup log file. According to the embodiments of the present disclosure, while decompressing the log compressed file, the backup log file might not be obtained due to the log compressed file corruption and other reasons, at which point it may be considered that the snapshot consistency level of the virtual machine snapshot is a failure consistency level.

In block 312, the virtual machine backup/recovery system 110 determines items in the backup log file which are associated with write operations in the virtual machine backup process and determine whether contents corresponding to these items have been successfully backed up. According to the embodiments of the present disclosure, the backup log file records which applications in the virtual machine 120 perform write operations while taking the virtual machine snapshot, and records contents of these write operations and whether these write operations succeed or not, i.e. contents corresponding to these write operations have been successfully backed up. If a certain write operation is performed successfully, this means that contents corresponding to the write operation are successfully written when the virtual machine snapshot is taken, and thus are successfully backed up. On the contrary, if a certain write operation is not successfully performed, this means that contents corresponding to the write operation are not successfully written when the virtual machine snapshot is taken, and thus are in a pending I/O and are not successfully backed up.

For example, regarding the backup.xml file as the backup log file, an item comprising "writerId" is an item associated with a write operation in the virtual machine backup process. For the backup.xml file, a header of the file may be found for character matching to find the item comprising "writerId." Later, the item comprising "writerId" in the backup.xml file will be followed by a corresponding item comprising "backupSucceeded." If the item comprising "backup Succeeded" records "backup Succeeded="yes"," this means that contents corresponding to the item comprising "writerId" have been successfully written, i.e. is successfully backed up when the virtual machine snapshot is taken. If the item comprising "backupSucceeded" records "backupSucceeded="no"," this means that contents corresponding to the item comprising "writerId" have not been successfully written, i.e. is not successfully backed up when the virtual machine snapshot is taken. According to the embodiments of the present disclosure, the comparison may be effected in the form of character string matching.

According to the embodiments of the present disclosure, the snapshot consistency level of the generated virtual machine snapshot may be determined by determining items in the backup log file which are associated with write operations in the virtual backup process and determining whether contents corresponding to these items are successfully backed up.

In block 314, the virtual machine backup/recovery system 110 determines whether all contents corresponding to items associated with write operations are successfully backed up. According to the embodiments of the present disclosure, counters may be set while determining whether all corresponding contents are successfully backed up. Two counters may be set, among which a success counter indicates the number of contents that are successfully backed up, and a failure counter indicates the number of contents whose backup fails. Every time one content is successfully backed up, the value of the success counter is increased by one, until each content is determined. The number of contents that are successfully backed up and the number of contents whose backup fails may be used for subsequent operations. If it is determined in block 314 that contents corresponding to each item among the items associated with write operations are successfully backed up, this indicates when the virtual machine snapshot is taken, neither of caches of the application and the file system has successfully written data, which means the snapshot consistency level of the generated virtual machine snapshot is an application consistency level as shown in block 316. When it is determined in block 314 that not all corresponding contents are successfully backed up, the flow proceeds to block 318.

In block 318, the virtual machine backup/recovery system 110 determines whether none of contents corresponding to items associated with write operations is successfully backed up. According to the embodiments of the present disclosure, if it is determined in block 318 that contents corresponding to each of items associated with write operations is not successfully backed up, this indicates when the virtual machine snapshot is taken, none of data involved in write operations in caches of the application and the file system is successfully flushed. In this case, it may be considered that the snapshot consistency level of the generated virtual machine snapshot is quite low, so the snapshot consistency level of the generated virtual machine snapshot may be considered as a failure consistency level, just as shown in block 320. According to other embodiments of the present disclosure, in this case, it may also be considered that the snapshot consistency level of the generated virtual machine snapshot is a file consistency level, and a consistency level of this file consistency level is quite low.

If it is determined in block 318 that for each item among the items associated with write operation, corresponding contents are not entirely backed up successfully, i.e. some contents are successfully backed up while backup for other contents fails, then the snapshot consistency level of the generated virtual machine snapshot is considered as a file consistency level, just as shown in block 322. It is noteworthy that in some cases, the backup log fie might be null. These cases might be caused by a bug in Microsoft or VMware software, thereby neither successful backup nor failed backup for contents. At this point, it may still be considered that the snapshot consistency level of the generated virtual machine snapshot is a file consistency level, because the fact that the backup log file can be generated shows the log system within the virtual machine backup/recovery system 110 still works normally.

According to the embodiments of the present disclosure, the snapshot consistency level may be further divided using the number of contents that are successfully backed up and the number of contents whose backup fails. For example, where the success counter and the failure counter are used to record the number of contents that are successfully backed up and the number of contents whose backup fails respectively, if neither values of the success counter and the failure counter is zero, the snapshot consistency level of the generated virtual machine snapshot is a file consistency level. At this point, the file consistency level may be further divided according to values of the success counter and the failure counter, so as to further distinguish between a better file consistency level and a worse file consistency level. For example, when the value of the success counter is much larger or larger than the value of the failure counter, it may be considered that the snapshot consistency level is an excellent file consistency level; when the success counter and the failure counter have an equal value or a slight difference, it may be considered that the snapshot consistency level is a medium file consistency level; when the value of the success counter is much less or less than the value of the failure counter, it may be considered that the snapshot consistency level is a bad file consistency level. It should be appreciated that the file consistency level may be divided into a random number of sub-levels by setting a value ratio threshold.

According to the embodiments of the present disclosure, after the snapshot consistency level of the generated virtual machine snapshot is generated, the administrator, customer or user of the virtual machine 120 may perform different operations depending on different snapshot consistency levels. When requesting virtual machine backup, the administrator, customer or user may specify different operations to be performed depending on different snapshot consistency levels. At this point, after taking a virtual machine snapshot and determining a snapshot consistency level of the generated virtual machine snapshot, the virtual machine backup/recovery system 110 will automatically perform the specified operation for the virtual machine snapshot.

As seen from the foregoing description with reference to FIGS. 1 to 3, the technical solution according to the embodiments of the present disclosure has many advantages over the prior art. By means of the technical solution according to the embodiments of the present disclosure, the problem in the prior art that a snapshot consistency level of a generated virtual machine snapshot cannot be determined for some virtual machine software or different versions (e.g. VMware 6.0 version and lower, VMware 6.5 version and higher) of some virtual machine software. Meanwhile, the technical solution according to the embodiments of the present disclosure may use a unified method to determine the snapshot consistency level of the generated virtual machine snapshot for some virtual machine software or different versions of some virtual machine software. Furthermore, after the snapshot consistency level of the generated virtual machine snapshot is determined correctly, the level may be reported to the user or automatically executed to select a suitable virtual machine snapshot and perform suitable post backup operations, so that the recovery effect of the virtual machine backup/recovery system 110 is maximized. Finally, the technical solution according to the embodiments of the present disclosure is brief and efficient.

Figure 4:
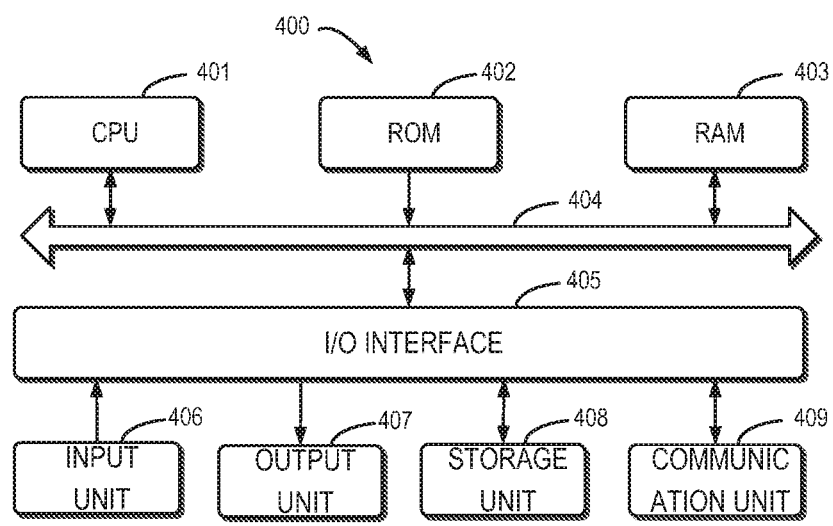
FIG. 4 shows a schematic block diagram of an exemplary device 400 that can be used to implement the embodiments of the present disclosure.

FIG. 4 shows a schematic block diagram of an exemplary device 400 hat can be used to implement the embodiments of the present disclosure. As shown, the device 400 comprises a central processing unit (CPU) 401 which is capable of performing various appropriate actions and processes in accordance with computer program instructions stored in a read only memory (ROM) 402 or computer program instructions loaded from a storage unit 408 to a random access memory (RAM) 403. In the RAM 403, there are also stored various programs and data required by the device 400 when operating. The CPU 401, the ROM 402 and the RAM 403 are connected to one another via a bus 404. An input/output (I/O) interface 405 is also connected to the bus 404.

Multiple components in the device 400 are connected to the I/O interface 405: an input unit 406 including a keyboard, a mouse, or the like; an output unit 407, such as various types of displays, a loudspeaker or the like; a storage unit 408, such as a disk, an optical disk or the like; and a communication unit 409, such as a LAN card, a modem, a wireless communication transceiver or the like. The communication unit 409 allows the device 400 to exchange information/data with other device via a computer network, such as the Internet, and/or various telecommunication networks.

The above-described procedures and processes, such as the methods 200 and 300 may be executed by the processing unit 401. For example, in some embodiments, the methods 200 and 300 may be implemented as a computer software program, which is tangibly embodied on a machine readable medium, e.g. the storage unit 408. In some embodiments, part or the entirety of the computer program may be loaded to and/or installed on the device 400 via the ROM 402 and/or the communication unit 409. The computer program, when loaded to the RAM 403 and executed by the CPU 401, may perform one or more acts of the methods 200 and 300 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of determining a consistency level of a virtual machine snapshot, comprising:
    obtaining a backup log file of the virtual machine snapshot generated in a virtual machine backup process, the backup log file comprising log information related to the generation of the virtual machine snapshot;
    determining the consistency level of the virtual machine snapshot based on the backup log file, the consistency level indicating a matching degree between a state of a virtual machine represented by the virtual machine snapshot and an actual state of the virtual machine when the virtual machine snapshot is generated and the consistency level comprises of at least three levels: failure consistency level, file consistency level and application consistency level; and
    sending information on the consistency level to a user of the virtual machine,
    wherein determining the consistency level of the virtual machine snapshot comprises:
        determining at least one item in the backup log file that is associated with a write operation in the virtual machine backup process; and
        determining the consistency level by determining whether contents corresponding to the at least one item are successfully backed up.

2. The method according to claim 1, wherein obtaining the backup log file of the virtual machine snapshot comprises:
    obtaining a log compressed file generated in association with the virtual machine snapshot; and
    decompressing the log compressed file to obtain the backup log file.

3. The method according to claim 1, wherein determining the consistency level by determining whether contents corresponding to the at least one item is successfully backed up comprises:
    in response to contents corresponding to all of the at least one item being successfully backed up, determining the consistency level as being the application consistency level; and
    in response to contents corresponding to part of the at least one item being successfully backed up, determining the consistency level as being the file consistency level; and
    in response to contents corresponding to all of the at least one item failing to be successfully backed up, determining the consistency level as being the failure consistency level.

4. The method according to claim 1, further comprising:
    in response to failing to obtaining the backup log file successfully, determining the consistency level as being the failure consistency level.

5. The method according to claim 1, further comprising:
    performing, based on the consistency level, at least one of the following operations using the virtual machine snapshot: log truncation, cloud disaster recovery, and virtual machine recovery.

6. The method according to claim 1, further comprising:
    receiving an indication that specifies an operation corresponding to a different consistency level, the operation comprising at least one of: log truncation, cloud disaster recovery, and virtual machine recovery; and
    performing an operation corresponding to the determined consistency level of the virtual machine snapshot as specified in the indication.

7. A device for determining a consistency level of a virtual machine snapshot, comprising:

at least one processing unit;

at least one memory being coupled to the at least one processing unit and storing instructions for being executed by the at least one processing unit, the instructions, when being executed by the at least one processing unit, causing the device to perform a method, the method comprising:

obtaining a backup log file of the virtual machine snapshot generated in a virtual machine backup process, the backup log file comprising log information related to the generation of the virtual machine snapshot;

determining the consistency level of the virtual machine snapshot based on the backup log file, the consistency level indicating a matching degree between a state of a virtual machine represented by the virtual machine snapshot and an actual state of the virtual machine when the virtual machine snapshot is generated and the consistency level comprises of at least three levels: failure consistency level, file consistency level and application consistency level; and sending information on the consistency level to a user of the virtual machine, wherein determining the consistency level of the virtual machine snapshot comprises:

determining at least one item in the backup log file that is associated with a write operation in the virtual machine backup process; and determining the consistency level by determining whether contents corresponding to the at least one item are successfully backed up.

8. The device according to claim 7, wherein obtaining the backup log file of the virtual machine snapshot comprises:

obtaining a log compressed file generated in association with the virtual machine snapshot; and decompressing the log compressed file to obtain the backup log file.

9. The device according to claim 7, wherein determining the consistency level by determining whether contents corresponding to the at least one item is successfully backed up comprises:

in response to contents corresponding to all of the at least one item being successfully backed up, determining the consistency level as being the application consistency level; and in response to contents corresponding to part of the at least one item being successfully backed up, determining the consistency level as being the file consistency level; and in response to contents corresponding to all of the at least one item failing to be successfully backed up, determining the consistency level as being the failure consistency level.

10. The device according to claim 7, wherein the method further comprises:

in response to failing to obtaining the backup log file successfully, determining the consistency level as being the failure consistency level.

11. The device according to claim 7, wherein the method further comprises:

performing, based on the consistency level, at least one of the following operations using the virtual machine snapshot: log truncation, cloud disaster recovery, and virtual machine recovery.

12. The device according to claim 7, wherein the method further comprises:

receiving an indication that specifies an operation corresponding to a different consistency level, the operation comprising at least one of: log truncation, cloud disaster recovery, and virtual machine recovery; and performing an operation corresponding to the determined consistency level of the virtual machine snapshot as specified in the indication.

13. A computer program product being tangibly stored on a non-transient computer readable medium and comprising machine executable instructions which, when being executed, causing a machine to perform steps of a method, the method comprising:

obtaining a backup log file of the virtual machine snapshot generated in a virtual machine backup process, the backup log file comprising log information related to the generation of the virtual machine snapshot;

determining the consistency level of the virtual machine snapshot based on the backup log file, the consistency level indicating a matching degree between a state of a virtual machine represented by the virtual machine snapshot and an actual state of the virtual machine when the virtual machine snapshot is generated and the consistency level comprises of at least three levels: failure consistency level, file consistency level and application consistency level; and sending information on the consistency level to a user of the virtual machine, wherein determining the consistency level of the virtual machine snapshot comprises:

determining at least one item in the backup log file that is associated with a write operation in the virtual machine backup process; and determining the consistency level by determining whether contents corresponding to the at least one item are successfully backed up.

14. The computer program product according to claim 13, wherein obtaining the backup log file of the virtual machine snapshot comprises:

obtaining a log compressed file generated in association with the virtual machine snapshot; and decompressing the log compressed file to obtain the backup log file.

15. The computer program product according to claim 13, wherein determining the consistency level by determining whether contents corresponding to the at least one item is successfully backed up comprises:

in response to contents corresponding to all of the at least one item being successfully backed up, determining the consistency level as being the application consistency level; and in response to contents corresponding to part of the at least one item being successfully backed up, determining the consistency level as being the file consistency level; and in response to contents corresponding to all of the at least one item failing to be successfully backed up, determining the consistency level as being the failure consistency level.

* * * * *